(12) United States Patent
Kim et al.

(10) Patent No.: US 10,902,297 B1
(45) Date of Patent: Jan. 26, 2021

(54) METHOD FOR AUTO-LABELING TEST IMAGE BY USING CLASS-AGNOSTIC REFINEMENT MODULE, AND AUTO-LABELING DEVICE USING THE SAME

(71) Applicant: Superb AI Co., Ltd., Seoul (KR)

(72) Inventors: Kye-Hyeon Kim, Seoul (KR); Jung Kwon Lee, Gyeonggi-do (KR)

(73) Assignee: SUPERB AI CO., LTD., Seoul (KR)

( * ) Notice: Subject to any disclaimer, the term of this patent is extended or adjusted under 35 U.S.C. 154(b) by 0 days.

(21) Appl. No.: 16/984,707

(22) Filed: Aug. 4, 2020

(51) Int. Cl.
*G06K 9/62* (2006.01)
(52) U.S. Cl.
CPC ............ *G06K 9/6262* (2013.01); *G06K 9/627* (2013.01); *G06K 9/6232* (2013.01)
(58) Field of Classification Search
CPC ..... G06K 9/6262; G06K 9/6232; G06K 9/627
See application file for complete search history.

(56) References Cited

U.S. PATENT DOCUMENTS

| 10,269,125 B1* | 4/2019 | Kim | G06K 9/00718 |
| 2019/0026538 A1* | 1/2019 | Wang | G06K 9/4642 |
| 2019/0130188 A1* | 5/2019 | Zhou | G06K 9/00718 |
| 2019/0392268 A1* | 12/2019 | Tariq | G06K 9/00791 |
| 2020/0143205 A1* | 5/2020 | Yao | G06K 9/6262 |
| 2020/0184260 A1* | 6/2020 | Lai | G06K 9/6262 |
| 2020/0218888 A1* | 7/2020 | Gong | G06N 20/00 |

* cited by examiner

*Primary Examiner* — Utpal D Shah
(74) *Attorney, Agent, or Firm* — Xsensus LLP (57) ABSTRACT

A method for auto-labeling images by using a class-agnostic refinement module is provided. The method includes steps of: (a) an auto-labeling device inputting the images into a coverage controlling module, to thereby allow the coverage controlling module to detect objects on the images and thus to output first object detection data including first bounding box data and first class data; (b) the auto-labeling device inputting the images and the first bounding box data into the class-agnostic refinement module, to thereby allow the class-agnostic refinement module to detect the objects on the images and thus to generate second bounding box data, and allowing the class-agnostic refinement module to align the first bounding box data and the second bounding box data to thereby output refined bounding box data; and (c) the auto-labeling device generating second object detection data including the first class data and the refined bounding box data.

18 Claims, 8 Drawing Sheets

METHOD FOR AUTO-LABELING TEST IMAGE BY USING CLASS-AGNOSTIC REFINEMENT MODULE, AND AUTO-LABELING DEVICE USING THE SAME

FIELD OF THE DISCLOSURE

The present disclosure relates to a method for auto-labeling test image by using class-agnostic refinement module and a device using the same; and more particularly, to the method for auto-labeling test image by using class-agnostic refinement module and the device using the same.

BACKGROUND OF THE DISCLOSURE

Recently, researches has been conducted on a method for performing object detection using machine learning. Deep learning, which is a form of the machine learning using a neural network with multiple hidden layers between its input layer and its output layer, has a high performance on the object detection.

Generally, the neural network for the deep learning is trained through a backpropagation using at least one loss.

In order to train the neural network for the deep learning, training data labeled by many people may be needed. However, preparing this training data (i.e. classifying the data correctly) can be very labor-intensive, expensive and inconvenient, especially if a large amount of training data is to be used and if the quality of the data pre-preparation is not consistently high. Moreover, conventional interactive labeling can be computationally expensive and fail to deliver good results.

Accordingly, in most recent days, a method of labeling images by using a deep learning-based auto-labeling device and then allowing inspectors to inspect and/or correct the labeled images has been used.

However, since preparing a high-quality labeled training data by using the auto-labeling device may require high cost, it may be difficult to secure both a wide class coverage and a high bounding box accuracy.

As one example, in case the wide class coverage is a more important factor than the high bounding box accuracy, in order to secure the wide class coverage with a limited cost, losing a certain degree of the bounding box accuracy is inevitable.

As such, since there is a trade-off relationship between the class coverage and the bounding box accuracy, there may be a problem of having to select an appropriate ratio of weight therebetween.

Moreover, there remain other limitations, such as, it is difficult for the auto-labeling device to label objects beyond the class coverage. Furthermore, a large amount of labeled data is required in order to prepare the auto-labeling device with the wide class coverage.

SUMMARY OF DISCLOSURE

It is an object of the present disclosure to solve the aforementioned problems.

It is another object of the present disclosure to auto-label the test image by using a class-agnostic refinement module.

It is yet another object of the present disclosure to allow the auto-labeling device to have wide class coverage and high bounding box accuracy.

It is still another object of the present disclosure to allow the auto-labeling device to auto-label at least one object beyond the class coverage.

It is still yet another object of the present disclosure to train auto-labeling device with wide class coverage without having to prepare large amount of labeled data.

In accordance with one aspect of the present disclosure, there is provided a method for auto-labeling at least one test image by using a class-agnostic refinement module, comprising steps of: (I) an auto-labeling device, if the test image is acquired, performing a process of inputting the test image into a coverage controlling module, to thereby allow the coverage controlling module to detect at least one object for testing on the test image and thus to output at least one first object detection data for testing which includes at least one first bounding box data for testing and at least one first class data for testing; (II) the auto-labeling device performing a process of inputting the test image and the first bounding box data for testing into the class-agnostic refinement module, to thereby allow the class-agnostic refinement module to detect the object for testing on the test image and thus to generate at least one second bounding box data for testing, and a process of allowing the class-agnostic refinement module to align the first bounding box data for testing and the second bounding box data for testing to thereby output at least one refined bounding box data for testing; and (III) the auto-labeling device performing a process of generating at least one second object detection data for testing which includes the first class data for testing and the refined bounding box data for testing.

As one example, at the step of (II), the auto-labeling device performs a process of inputting the test image into an accuracy controlling module, to thereby allow the accuracy controlling module to detect the object for testing on the test image and thus to output at least one third object detection data for testing which includes at least one third bounding box data for testing and at least one third class data for testing, and a process of merging the second object detection data for testing and the third object detection data for testing, to thereby generate at least one merged object detection data for testing and thus update the second object detection data for testing with the merged object detection data for testing.

As one example, at the step of (II), the auto-labeling device performs a process of merging the second object detection data for testing and the third object detection data for testing by using a non-maximum suppression scheme.

As one example, by a learning device, the class-agnostic refinement module has been trained to output the second bounding box data for testing corresponding to the test image.

As one example, the learning device (i) has performed or has supported the auto-labeling device to perform a process of inputting at least one main training image into the coverage controlling module, to thereby allow the coverage controlling module to detect at least one object for main training on the main training image and thus to output at least one first bounding box data for main training, (ii) has performed or has supported the auto-labeling device to perform a process of inputting the main training image and first bounding box data for main training into the class-agnostic refinement module, to thereby allow the class-agnostic refinement module to detect the object for main training on the main training image and thus to generate at least one second bounding box data for main training, (iii) has performed a process of allowing the class-agnostic refinement module to align the first bounding box data for main training and the second bounding box data for main training to thereby output at least one refined bounding box data for main training, and (iv) has performed a process of generating at least one bounding box loss for main training by referring to the refined bounding box data for main training and at least one ground truth of the main training image, to thereby train the class-agnostic refinement module by using the bounding box loss for main training.

As one example, at the (ii), the learning device (ii-1) has performed or has supported the auto-labeling device to perform a process of inputting the main training image into the accuracy controlling module, to thereby allow the accuracy controlling module to detect the object for main training on the main training image and thus to output at least one third bounding box data for main training, and (ii-2) has performed a process of merging the second object detection data for main training and the third object detection data for main training, to thereby generate at least one merged bounding box data for main training and thus update the second object detection data for main training with the merged bounding box data for main training.

As one example, the learning device has performed a process of merging the second object detection data for main training and the third object detection data for main training by using a non-maximum suppression scheme.

As one example, by a learning device, the class-agnostic refinement module has been trained to output the second bounding box data for testing corresponding to the test image.

As one example, the learning device (i) (i-1) has performed or has supported the auto-labeling device to perform a process of inputting at least one first sub training image into the coverage controlling module, to thereby allow the coverage controlling module to detect at least one object for first sub training on the first sub training image and thus to output at least one first bounding box data for first sub training, (i-2) has performed a process of inputting the first sub training image into bounding box error module, to thereby allow the bounding box error module to predict at least one error between the first bounding box data for first sub training and at least one ground truth of the first sub training image and thus to output at least one bounding box error prediction for first sub training, (i-3) performs a process of generating at least one bounding box error loss for first sub training by referring to the first bounding box data for first sub training and the ground truth of the first sub training image, to thereby train the bounding box error module by using the bounding box error loss for first sub training, (ii) (ii-1) has performed a process of inputting at least one second sub training image into the bounding box error module, to thereby allow the bounding box error module to output at least one bounding box error prediction for second sub training which corresponds to at least one object for second sub training on the second sub training image, (ii-2) has performed a process of performing at least one concatenation operation by using the bounding box error prediction for second sub training and at least one ground truth of the second sub training image and thus has generated at least one first bounding box data for second sub training, (ii-3) has performed or has supported the auto-labeling device to perform a process of inputting the second sub training image and the first bounding box data for second sub training into the class-agnostic refinement module, to thereby allow the class-agnostic refinement module to detect the object for second sub training on the second sub training image and thus to generate at least one second bounding box data for second sub training, (ii-4) has performed a process of allowing the class-agnostic refinement module to align the first bounding box data for second sub training and the second bounding box data for second sub training, to thereby output at least one refined bounding box data for second sub training, and (ii-5) has performed a process of generating at least one bounding box loss for second sub training by referring to the refined bounding box data for second sub training and the ground truth of the second sub training image, to thereby train the class-agnostic refinement module by using the bounding box loss for second sub training.

As one example, the learning device has performed a process of allowing the bounding box error module (i) to perform at least one convolution operation on the first sub training image and thus to generate at least one feature map for first sub training, (ii) to perform at least one ROI pooling operation on the feature map for first sub training by using the ground truth of the first sub training image and thus to generate at least one pooled feature map for first sub training, and (iii) to perform at least one fully-connected operation on the pooled feature map for first sub training and thus to output the bounding box error prediction for first sub training.

As one example, the learning device allows the bounding box error module to perform a set of operations including an operation of randomly setting at least one element of the pooled feature map for first sub training to zero and the fully-connected operation thereon.

In accordance with another aspect of the present disclosure, there is provided an auto-labeling device for auto-labeling at least one test image by using a class-agnostic refinement module, including: at least one memory that stores instructions; and at least one processor configured to execute the instructions to perform or support another device to perform: (I) if the test image is acquired, a process of inputting the test image into a coverage controlling module, to thereby allow the coverage controlling module to detect at least one object for testing on the test image and thus to output at least one first object detection data for testing which includes at least one first bounding box data for testing and at least one first class data for testing; (II) a process of inputting the test image and the first bounding box data for testing into the class-agnostic refinement module, to thereby allow the class-agnostic refinement module to detect the object for testing on the test image and thus to generate at least one second bounding box data for testing, and a process of allowing the class-agnostic refinement module to align the first bounding box data for testing and the second bounding box data for testing to thereby output at least one refined bounding box data for testing; and (III) a process of generating at least one second object detection data for testing which includes the first class data for testing and the refined bounding box data for testing.

As one example, at the process of (II), the processor performs a process of inputting the test image into an accuracy controlling module, to thereby allow the accuracy controlling module to detect the object for testing on the test image and thus to output at least one third object detection data for testing which includes at least one third bounding box data for testing and at least one third class data for testing, and a process of merging the second object detection data for testing and the third object detection data for testing, to thereby generate at least one merged object detection data for testing and thus update the second object detection data for testing with the merged object detection data for testing.

As one example, at the process of (II), the processor performs a process of merging the second object detection data for testing and the third object detection data for testing by using a non-maximum suppression scheme.

As one example, by a learning device, the class-agnostic refinement module has been trained to output the second bounding box data for testing corresponding to the test image.

As one example, the learning device (i) has performed or has supported the auto-labeling device to perform a process of inputting at least one main training image into the coverage controlling module, to thereby allow the coverage controlling module to detect at least one object for main training on the main training image and thus to output at least one first bounding box data for main training, (ii) has performed or has supported the auto-labeling device to perform a process of inputting the main training image and first bounding box data for main training into the class-agnostic refinement module, to thereby allow the class-agnostic refinement module to detect the object for main training on the main training image and thus to generate at least one second bounding box data for main training, (iii) has performed a process of allowing the class-agnostic refinement module to align the first bounding box data for main training and the second bounding box data for main training to thereby output at least one refined bounding box data for main training, and (iv) has performed a process of generating at least one bounding box loss for main training by referring to the refined bounding box data for main training and at least one ground truth of the main training image, to thereby train the class-agnostic refinement module by using the bounding box loss for main training.

As one example, at the (ii), the learning device (ii-1) has performed or has supported the auto-labeling device to perform a process of inputting the main training image into the accuracy controlling module, to thereby allow the accuracy controlling module to detect the object for main training on the main training image and thus to output at least one third bounding box data for main training, and (ii-2) has performed a process of merging the second object detection data for main training and the third object detection data for main training, to thereby generate at least one merged bounding box data for main training and thus update the second object detection data for main training with the merged bounding box data for main training.

As one example, the learning device has performed a process of merging the second object detection data for main training and the third object detection data for main training by using a non-maximum suppression scheme.

As one example, by a learning device, the class-agnostic refinement module has been trained to output the second bounding box data for testing corresponding to the test image.

As one example, the learning device (i) (i-1) has performed or has supported the auto-labeling device to perform a process of inputting at least one first sub training image into the coverage controlling module, to thereby allow the coverage controlling module to detect at least one object for first sub training on the first sub training image and thus to output at least one first bounding box data for first sub training, (i-2) has performed a process of inputting the first sub training image into bounding box error module, to thereby allow the bounding box error module to predict at least one error between the first bounding box data for first sub training and at least one ground truth of the first sub training image and thus to output at least one bounding box error prediction for first sub training, (i-3) performs a process of generating at least one bounding box error loss for first sub training by referring to the first bounding box data for first sub training and the ground truth of the first sub training image, to thereby train the bounding box error module by using the bounding box error loss for first sub training, (ii) (ii-1) has performed a process of inputting at least one second sub training image into the bounding box error module, to thereby allow the bounding box error module to output at least one bounding box error prediction for second sub training which corresponds to at least one object for second sub training on the second sub training image, (ii-2) has performed a process of performing at least one concatenation operation by using the bounding box error prediction for second sub training and at least one ground truth of the second sub training image and thus has generated at least one first bounding box data for second sub training, (ii-3) has performed or has supported the auto-labeling device to perform a process of inputting the second sub training image and the first bounding box data for second sub training into the class-agnostic refinement module, to thereby allow the class-agnostic refinement module to detect the object for second sub training on the second sub training image and thus to generate at least one second bounding box data for second sub training, (ii-4) has performed a process of allowing the class-agnostic refinement module to align the first bounding box data for second sub training and the second bounding box data for second sub training, to thereby output at least one refined bounding box data for second sub training, and (ii-5) has performed a process of generating at least one bounding box loss for second sub training by referring to the refined bounding box data for second sub training and the ground truth of the second sub training image, to thereby train the class-agnostic refinement module by using the bounding box loss for second sub training.

As one example, the learning device has performed a process of allowing the bounding box error module (i) to perform at least one convolution operation on the first sub training image and thus to generate at least one feature map for first sub training, (ii) to perform at least one ROI pooling operation on the feature map for first sub training by using the ground truth of the first sub training image and thus to generate at least one pooled feature map for first sub training, and (iii) to perform at least one fully-connected operation on the pooled feature map for first sub training and thus to output the bounding box error prediction for first sub training.

As one example, the learning device allows the bounding box error module to perform a set of operations including an operation of randomly setting at least one element of the pooled feature map for first sub training to zero and the fully-connected operation thereon.

BRIEF DESCRIPTION OF THE DRAWINGS

The above and other objects and features of the present disclosure will become apparent from the following description of preferred embodiments given in conjunction with the accompanying drawings. The accompanying drawings used to explain example embodiments of the present disclosure are only part of example embodiments of the present disclosure and other drawings can be obtained based on the drawings by those skilled in the art of the present disclosure without inventive work.

DETAILED DESCRIPTION OF THE PREFERRED EMBODIMENTS

In the following detailed description, reference is made to the accompanying drawings that show, by way of illustration, specific embodiments in which the disclosure may be practiced. These embodiments are described in sufficient detail to enable those skilled in the art to practice the disclosure. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout several aspects.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

Besides, in the detailed description and claims of the present disclosure, a term "include" and its variations are not intended to exclude other technical features, additions, components or steps. Other objects, benefits and features of the present disclosure will be revealed to one skilled in the art, partially from the specification and partially from the implementation of the present disclosure. The following examples and drawings will be provided as examples but they are not intended to limit the present disclosure.

The headings and abstract of the present disclosure provided herein are for convenience only and do not limit or interpret the scope or meaning of the embodiments.

For reference, throughout the present disclosure, the phrase "for training" or "training" is added to terms related to training processes, and the phrase "for testing", "testing", or "test" is added to terms related to testing processes, to avoid possible confusion.

To allow those skilled in the art to carry out the present disclosure easily, the example embodiments of the present disclosure will be explained by referring to attached diagrams in detail as shown below.

Figure 1:
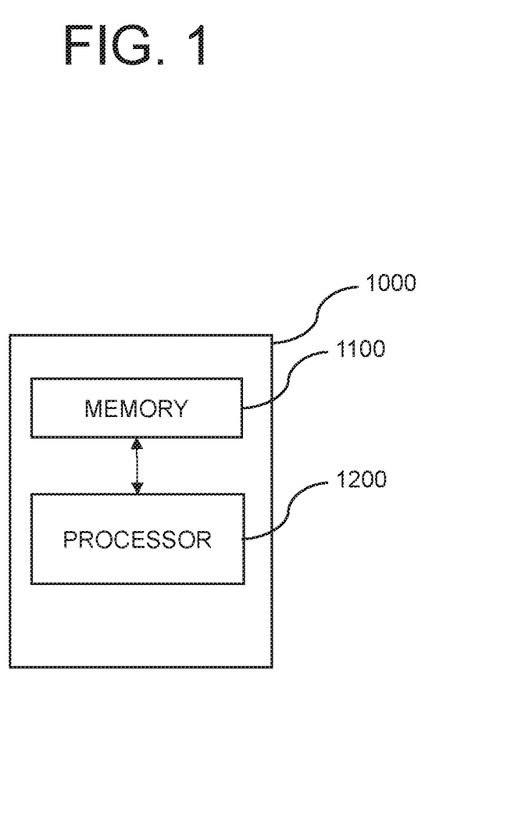
FIG. 1 is a drawing representing an auto-labeling device for auto-labeling a test image by using a class-agnostic refinement module in accordance with one example embodiment of the present disclosure.

FIG. 1 is a drawing representing an auto-labeling device for auto-labeling a test image by using a class-agnostic refinement module in accordance with one example embodiment of the present disclosure. Herein, throughout the present disclosure, a term "module" may include its corresponding model. By referring to the FIG. 1, the auto-labeling device 1000 may include a memory 1100 which stores one or more instructions for auto-labeling the test image and a processor 1200 which performs functions for auto-labeling the test image in response to the instructions stored in the memory 1100.

In specific, the auto-labeling device 1000 may typically achieve a required performance by combining one or more computing devices and one or more computer software. Herein, computing devices may include one or more computer processors, one or more memories, one or more storages, one or more input and output devices, and one or more other components conventionally included in computing device; one or more electronic communication devices, such as a router and a switch; and one or more electronic data storage systems, such as a network attached storage (NSA) and a storage area network (SAN), and herein, the computer software are one or more instructions respectively allowing the computing device to perform a corresponding function.

Additionally, the processor of the computing device may include one or more hardware configurations, such as micro processing unit (MPU), central processing unit (CPU), cache memory, data bus, etc. Moreover, the computing device may also include one or more operating systems and one or more software configurations of respective applications which serves respective purpose.

However, it should be noted that the computer device do not exclude integrated processor, which is a combined form of one or more media, one or more processors, and one or more memories.

Meanwhile, a method for auto-labeling the test image by using the auto-labeling device is explained below by referring to FIG. 2 and FIG. 3 in accordance with one example embodiment of the present disclosure.

Figure 2:
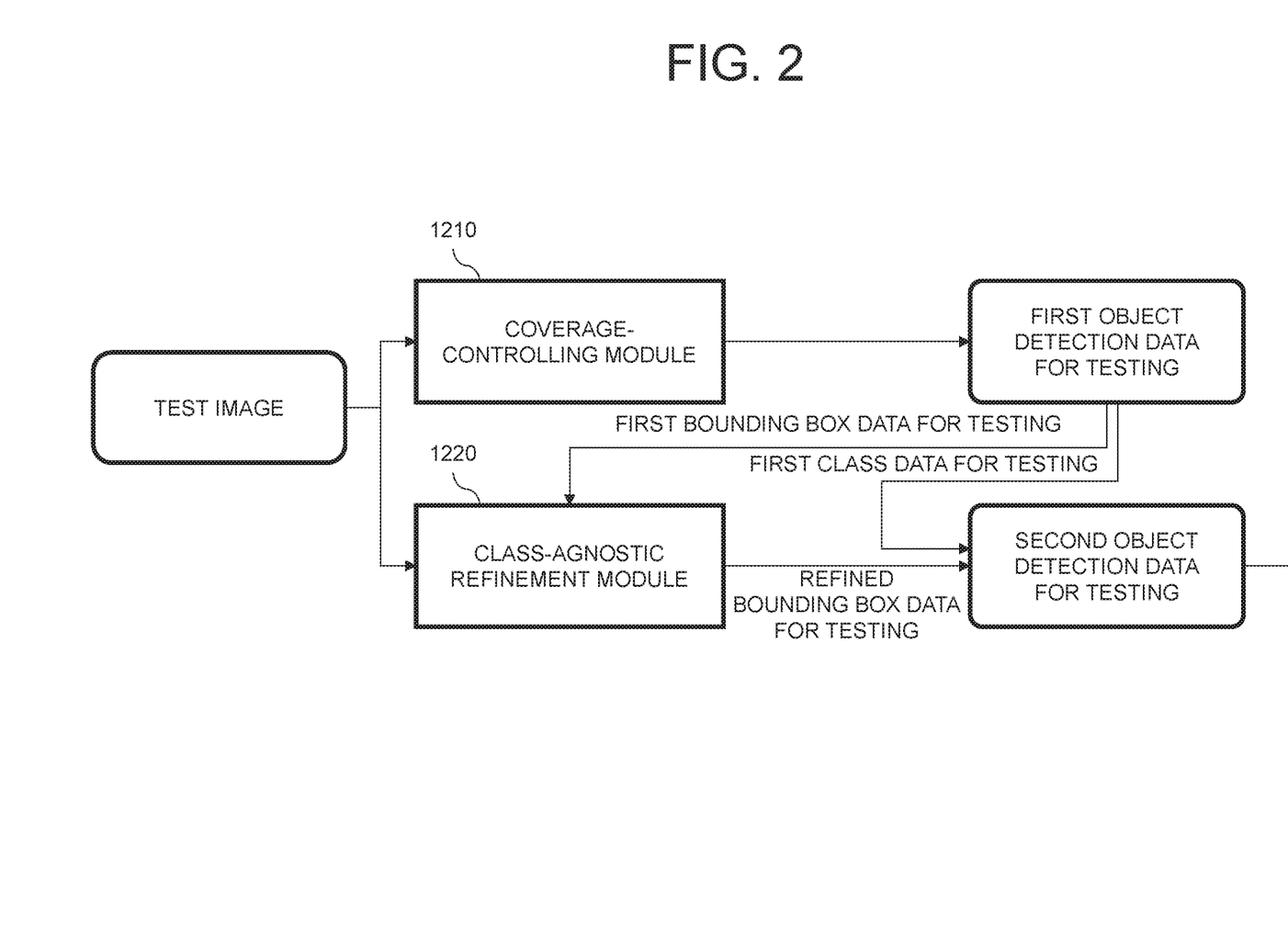
FIG. 2 is a drawing representing a method for auto-labeling the test image by using the class-agnostic refinement module and a coverage-controlling module in accordance with one example embodiment of the present disclosure.

First, by referring to FIG. 2, when the test image is acquired, the auto-labeling device 1000 may input the test image into a coverage-controlling module 1210.

Herein, the coverage-controlling module 1210 may have been trained to focus on a wide class coverage rather than a high bounding box accuracy, and may detect at least one object for testing on the test image and thus may output at least one first object detection data for testing. To be specific, the first objection data for testing may include at least one first bounding box data for testing which has a relatively low bounding box accuracy and at least one first class data for testing which has a relatively wide class coverage.

Thereafter, the auto-labeling device 1000 may input the test image and the first bounding box data for testing into a class-agnostic refinement module 1220.

Herein, the class-agnostic refinement module 1220 may detect the object for testing on the test image and thus may generate at least one second bounding box data for testing. Then, the class-agnostic refinement module 1220 may align the first bounding box data for testing and the second bounding box data for testing, to thereby output at least one refined bounding box data for testing.

Thereafter, the auto-labeling device 1000 may generate at least one second object detection data for testing which includes the first class data for testing and the refined bounding box data for testing.

Figure 3:
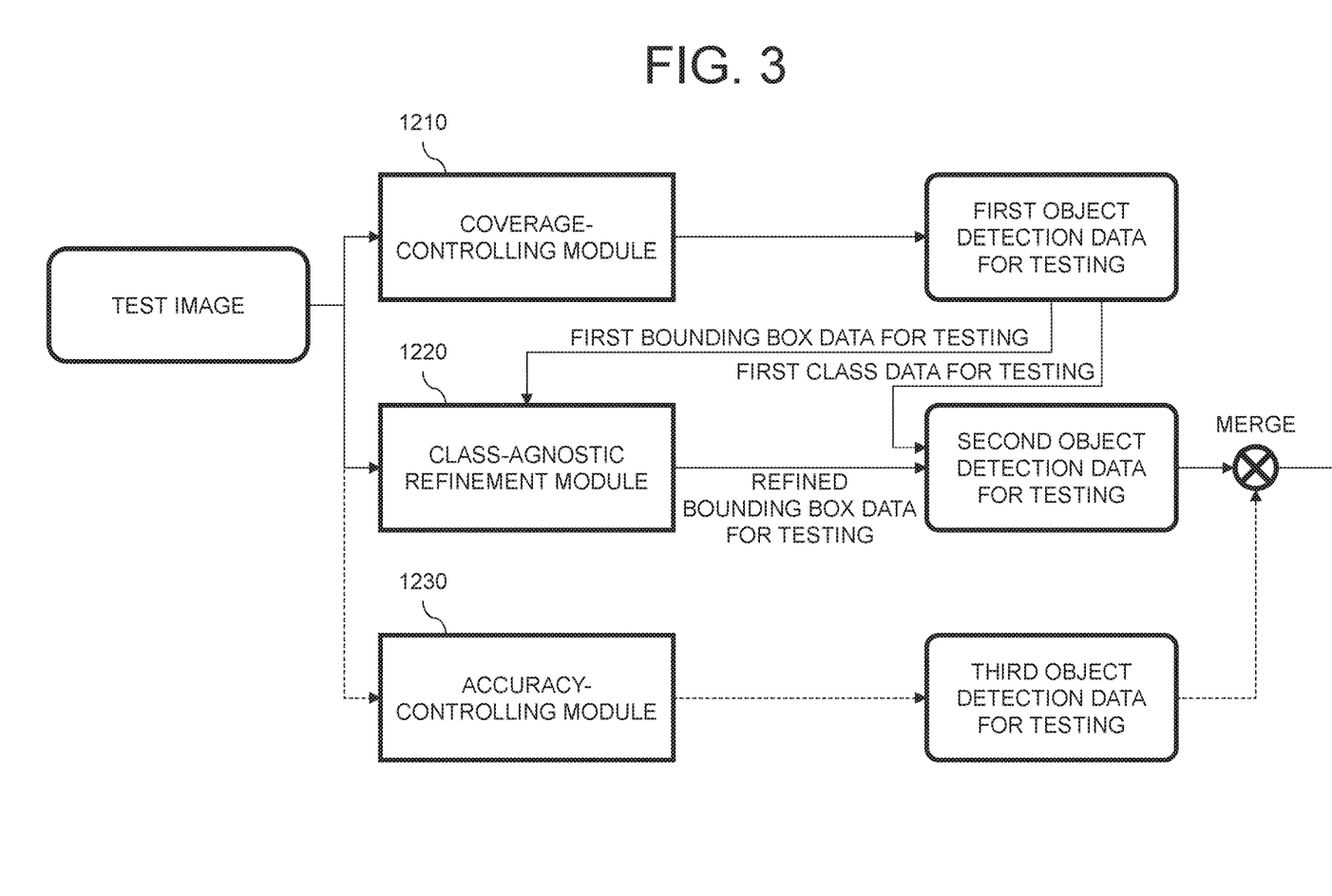
FIG. 3 is a drawing representing a method for auto-labeling the test image by using the class-agnostic refinement module, the coverage-controlling module, and an accuracy-controlling module in accordance with one example embodiment of the present disclosure.

Meanwhile, by referring to FIG. 3, the auto-labeling device 1000 may input the test image into an accuracy-controlling module 1230.

Herein, the accuracy-controlling module 1230 may have been trained to focus on the high bounding box accuracy rather than the wide class coverage, and may detect the object for testing on the test image and thus may output at least one third object detection data for testing. To be specific, the third objection data for testing may include at least one third bounding box data for testing which has a relatively high bounding box accuracy and at least one third class data for testing which has a relatively narrow class coverage.

Thereafter, the auto-labeling device 1000 may merge the second object detection data for testing and the third object detection data for testing and thus generate at least one merged object detection data for testing. Then, the auto-labeling device 1000 may update the second object detection data for testing with the merged object detection data for testing.

Herein, the auto-labeling device 1000 may merge the second object detection data for testing and the third object detection data for testing by using a non-maximum suppression scheme.

Meanwhile, a method for training the class-agnostic refinement module by using the coverage-controlling module is explained below by referring to FIG. 4, FIG. 5 and FIG. 6 in accordance with one example embodiment of the present disclosure.

Figure 4:
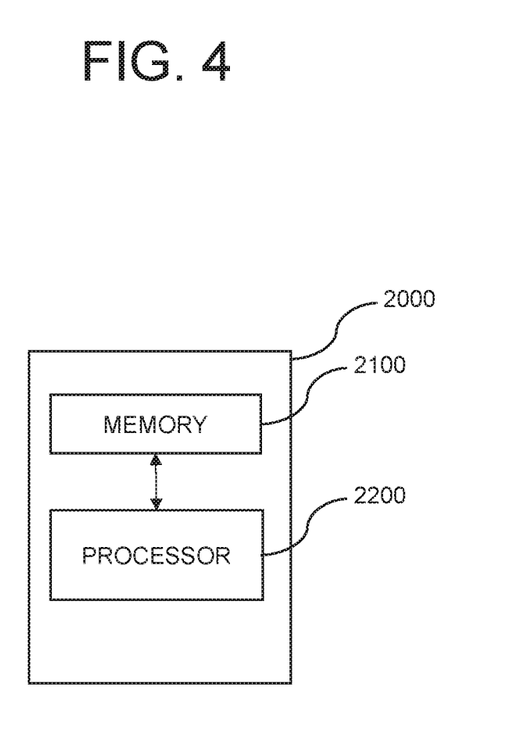
FIG. 4 is a drawing representing a learning device for training the class-agnostic refinement module and a bounding box error module in accordance with one example embodiment of the present disclosure.

First, FIG. 4 is a drawing representing a learning device for training the class-agnostic refinement module and a bounding box error module in accordance with one example embodiment of the present disclosure. By referring to FIG. 4, the learning device 2000 may include a memory 2100 which stores one or more instructions for training the class-agnostic refinement module and a bounding box error module and a processor 2200 which performs functions for training the class-agnostic refinement module and a bounding box error module in response to the instructions stored in the memory 2100.

Herein, the auto-labeling device 1000 may include the learning device 2000, but it is not limited thereto.

Figure 5:
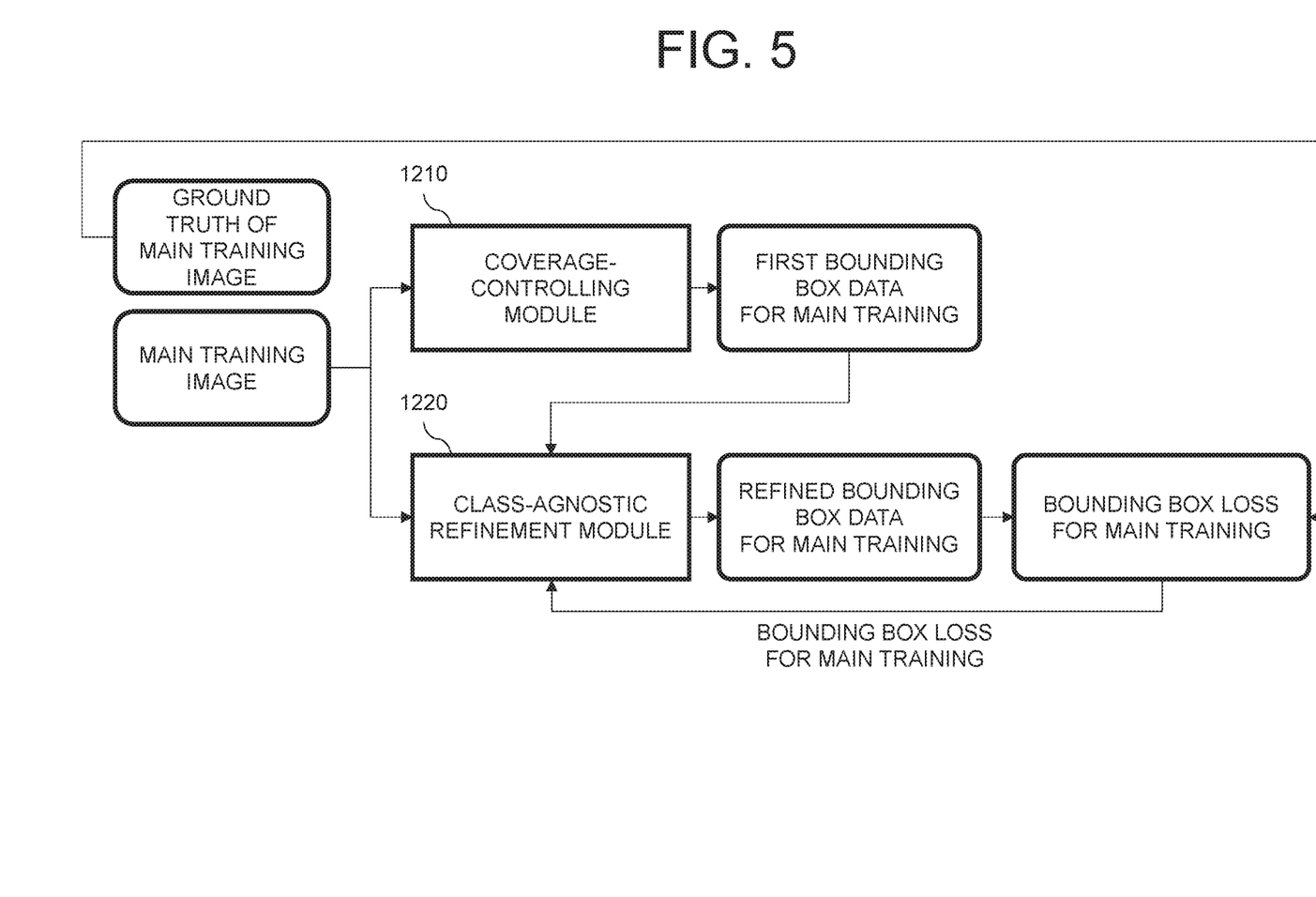
FIG. 5 is a drawing representing a method for training the class-agnostic refinement module by using the coverage-controlling module in accordance with one example embodiment of the present disclosure.

Meanwhile, FIG. 5 is a drawing representing a method for training the class-agnostic refinement module by using the coverage-controlling module in accordance with one example embodiment of the present disclosure.

In specific, the learning device 2000 may input or support the auto-labeling device 1000 to input at least one main training image into the coverage-controlling module 1210.

Herein, the coverage-controlling module 1210 may have been trained to focus on the wide class coverage rather than the high bounding box accuracy as aforementioned, and may detect at least one object for main training on the main training image and thus may output at least one first bounding box data for main training which has the relatively low bounding box accuracy.

Thereafter, the learning device 2000 may input or support the auto-labeling device 1000 to input the main training image and the first bounding box data for main training into the class-agnostic refinement module 1220.

Herein, the class-agnostic refinement module 1220 may detect the object for main training on the main training image and thus may generate at least one second bounding box data for main training. Then, the class-agnostic refinement module 1220 may align the first bounding box data for main training and the second bounding box data for main training, to thereby output at least one refined bounding box data for main training.

Thereafter, the learning device 2000 may generate at least one bounding box loss for main training by referring to the refined bounding box data for main training and at least one ground truth of the main training image. Then, the learning device 2000 may train class-agnostic refinement module 1220 by using the bounding box loss for main training.

Figure 6:
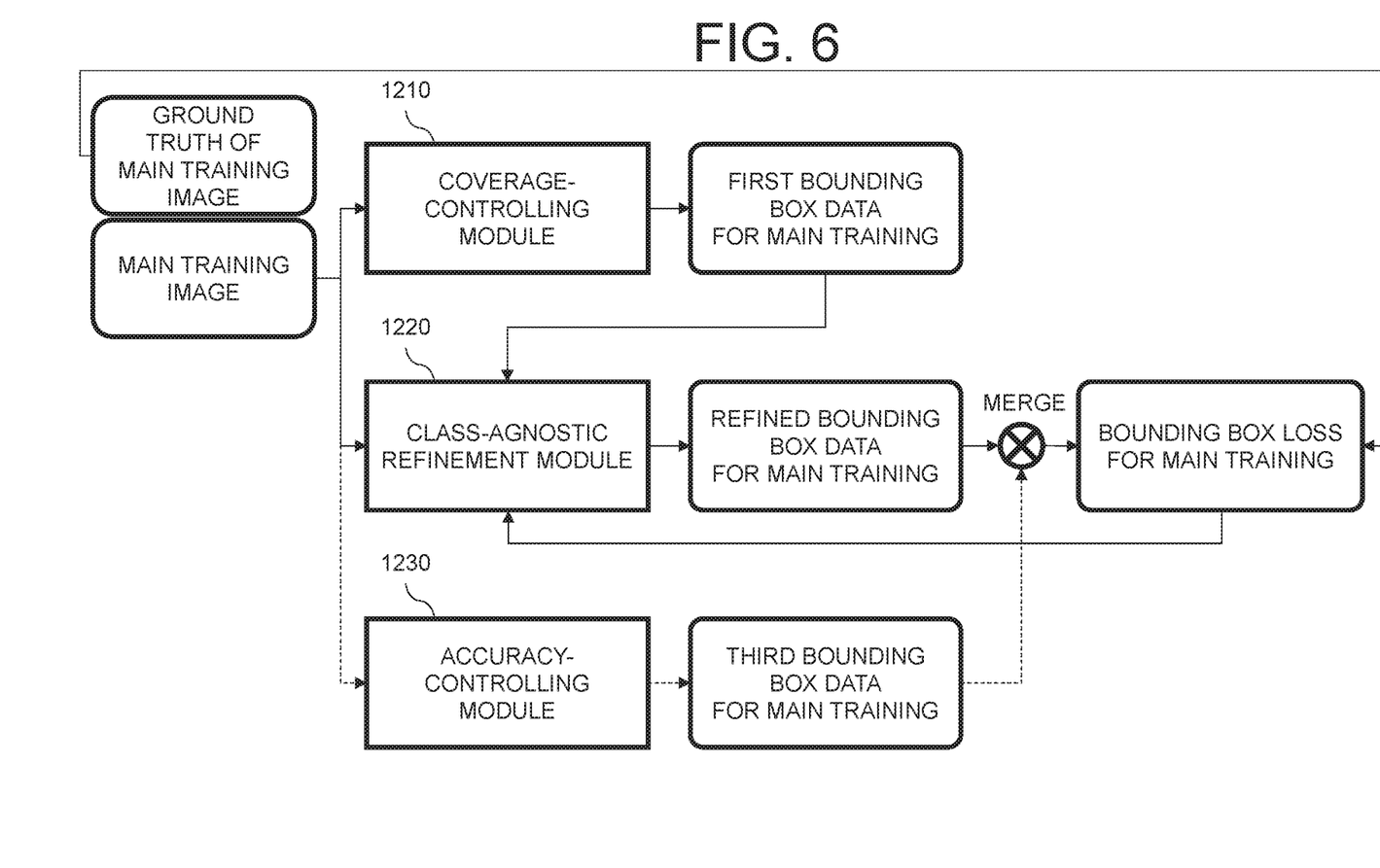
FIG. 6 is a drawing representing a method for training the class-agnostic refinement module by using the coverage-controlling module and the accuracy-controlling module in accordance with one example embodiment of the present disclosure.

Meanwhile, FIG. 6 is a drawing representing a method for training the class-agnostic refinement module by using the coverage-controlling module and the accuracy-controlling module in accordance with one example embodiment of the present disclosure.

In specific, the learning device 2000 may input or support the auto-labeling device 1000 to input the main training image into the accuracy-controlling module 1230.

Herein, the accuracy-controlling module 1230 may have been trained to focus on the high bounding box accuracy rather than the wide class coverage as aforementioned, and may detect the object for main training on the main training image and thus may output at least one third bounding box data for main training which has the relatively high bounding box accuracy.

Thereafter, the learning device 2000 may merge or support the auto-labeling device 1000 to merge the second bounding box data for main training and the third bounding box data for main training and thus have generated at least one merged bounding box data for main training. Then, the learning device 2000 may generate the bounding box loss for main training by referring to the merged bounding box data for main training and the ground truth of the main training image and thus may train class-agnostic refinement module 1220 by using the bounding box loss for main training.

Meanwhile, a method for training the bounding box error module by using the coverage-controlling module and a method for training the class-agnostic refinement module by using the bounding box error module is explained below by referring to FIG. 7 and FIG. 8 in accordance with one example embodiment of the present disclosure.

Figure 7:
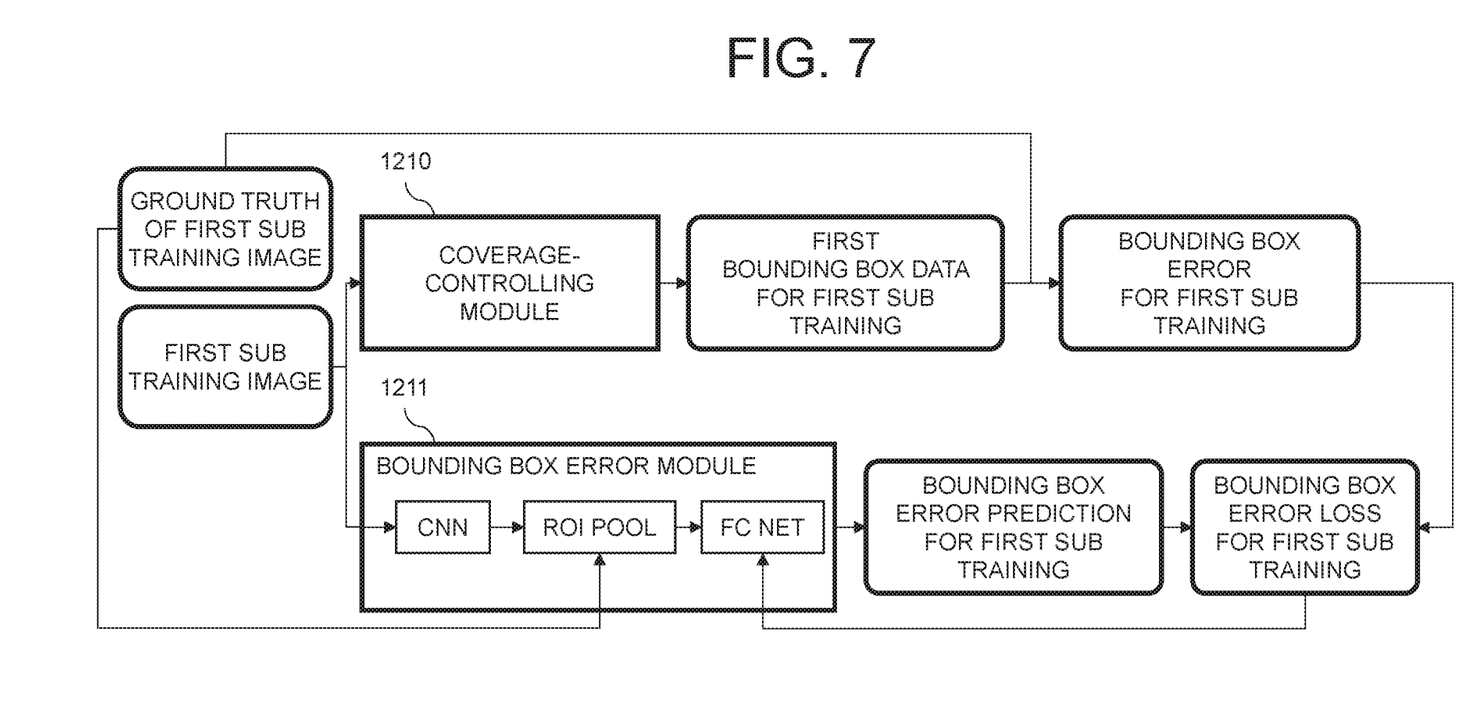
FIG. 7 is a drawing representing a method for training the bounding box error module by using the coverage-controlling module in accordance with one example embodiment of the present disclosure.

FIG. 7 is a drawing representing a method for training the bounding box error module by using the coverage-controlling module in accordance with one example embodiment of the present disclosure.

In specific, the learning device 2000 may input or support the auto-labeling device 1000 to input at least one first sub training image into the coverage-controlling module 1210.

Herein, the coverage-controlling module 1210 may have been trained to focus on the wide class coverage rather than the high bounding box accuracy as aforementioned, and may detect at least one object for first sub training on the first sub training image and thus may output at least one first bounding box data for first sub training which has the relatively low bounding box accuracy.

Thereafter, the learning device 2000 may input the first sub training image into the bounding box error module 1211.

Herein, the bounding box error module 1211 may predict at least one error between the first bounding box data for first sub training and at least one ground truth of the first sub training image and thus may output at least one bounding box error prediction for first sub training. In specific, the bounding box error module 1211 may perform at least one convolution operation on the first sub training image and thus may generate at least one feature map for first sub training. Then the bounding box error module 1211 may perform at least one ROI pooling operation on the feature map for first sub training by using the ground truth of the first sub training image and thus may generate at least one pooled feature map for first sub training. Moreover, the bounding box error module 1211 may perform at least one operation of randomly setting at least one element of the pooled feature map for first sub training to zero and thus may generate at least one noised pooled feature map for first sub training. Thereafter, the bounding box error module 1211 may perform at least one fully-connected operation on the noised pooled feature map for first sub training and thus may output the bounding box error prediction for first sub training.

Thereafter, the learning device 2000 may generate at least one bounding box error loss for first sub training by referring to the bounding box error prediction for first sub training and at least one bounding box error for first sub training corresponding to the error between the first bounding box data for first sub training and the ground truth of the first sub training image. Then, the learning device 2000 may train bounding box error module 1211 by using the bounding box error loss for first sub training.

Figure 8:
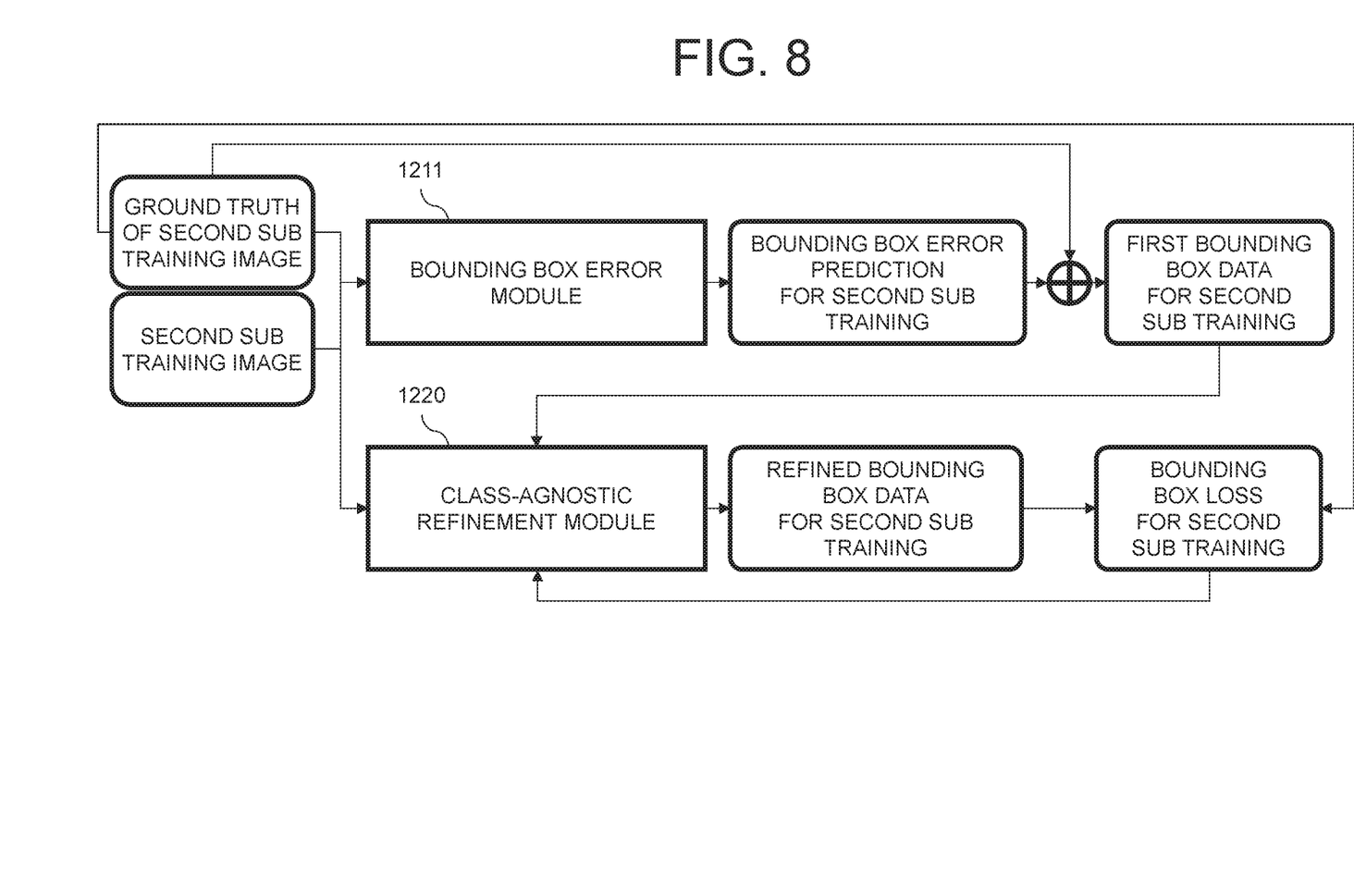
FIG. 8 is a drawing representing a method for training the class-agnostic refinement module by using the bounding box error module in accordance with one example embodiment of the present disclosure.

FIG. 8 is a drawing representing a method for training the class-agnostic refinement module by using the bounding box error module in accordance with one example embodiment of the present disclosure.

In specific, the learning device 2000 may input or support the auto-labeling device 1000 to input at least one second sub training image into the bounding box error module 1211.

Herein, the bounding box error module 1211 may output at least one bounding box error prediction for second sub training which corresponds to at least one object for second sub training on the second sub training image.

Thereafter, the learning device 2000 may perform at least one concatenation operation by using the bounding box error prediction for second sub training and at least one ground truth of the second sub training image and thus may generate at least one first bounding box data for second sub training.

Thereafter, the learning device 2000 may input or support the auto-labeling device 1000 to input the second sub training image and the first bounding box data for second sub training into the class-agnostic refinement module 1220.

Herein, the class-agnostic refinement module 1220 may detect the object for second sub training on the second sub training image and thus may generate at least one second bounding box data for second sub training. Then, the class-agnostic refinement module 1220 may align the first bounding box data for second sub training and the second bounding box data for second sub training and thus may output at least one refined bounding box data for second sub training.

Thereafter, the learning device 2000 may generate at least one bounding box loss for second sub training by referring to the refined bounding box data for second sub training and the ground truth of the second sub training image. Then, the learning device 2000 may train class-agnostic refinement module 1220 by using the bounding box loss for second sub training.

The present disclosure has an effect of providing the method for auto-labeling the test image by using a class-agnostic refinement module.

The present disclosure has another effect of providing the method for allowing the auto-labeling device to have wide class coverage and high bounding box accuracy.

The present disclosure has still another effect of providing the method for allowing the auto-labeling device to auto-label at least one object beyond the trained class coverage.

The present disclosure has still yet another effect of providing the method for training auto-labeling device with wide class coverage without preparing large amount of labeled data.

The embodiments of the present invention as explained above can be implemented in a form of executable program command through a variety of computer means recordable to computer readable media. The computer readable media may include solely or in combination, program commands, data files, and data structures. The program commands recorded to the media may be components specially designed for the present invention or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present invention and they can do the same in the opposite case.

As seen above, the present invention has been explained by specific matters such as detailed components, limited embodiments, and drawings. They have been provided only to help more general understanding of the present invention. It, however, will be understood by those skilled in the art that various changes and modification may be made from the description without departing from the spirit and scope of the invention as defined in the following claims.

Accordingly, the thought of the present invention must not be confined to the explained embodiments, and the following patent claims as well as everything including variations equal or equivalent to the patent claims pertain to the category of the thought of the present invention.

What is claimed is:

1. A method for auto-labeling at least one test image by using a class-agnostic refinement module, comprising steps of:

(a) an auto-labeling device, if the test image is acquired, performing a process of inputting the test image into a coverage controlling module, to thereby allow the coverage controlling module to detect at least one object for testing on the test image and thus to output at least one first object detection data for testing which includes at least one first bounding box data for testing and at least one first class data for testing;

(b) the auto-labeling device performing a process of inputting the test image and the first bounding box data for testing into the class-agnostic refinement module, to thereby allow the class-agnostic refinement module to detect the object for testing on the test image and thus to generate at least one second bounding box data for testing, and a process of allowing the class-agnostic refinement module to align the first bounding box data for testing and the second bounding box data for testing to thereby output at least one refined bounding box data for testing; and (c) the auto-labeling device performing a process of generating at least one second object detection data for testing which includes the first class data for testing and the refined bounding box data for testing.

2. The method of claim 1, wherein, at the step of (b), the auto-labeling device performs a process of inputting the test image into an accuracy controlling module, to thereby allow the accuracy controlling module to detect the object for testing on the test image and thus to output at least one third object detection data for testing which includes at least one third bounding box data for testing and at least one third class data for testing, and a process of merging the second object detection data for testing and the third object detection data for testing, to thereby generate at least one merged object detection data for testing and thus update the second object detection data for testing with the merged object detection data for testing.

3. The method of claim 2, wherein, at the step of (b), the auto-labeling device performs a process of merging the second object detection data for testing and the third object detection data for testing by using a non-maximum suppression scheme.

4. The method of claim 1, wherein, by a learning device, the class-agnostic refinement module has been trained to output the second bounding box data for testing corresponding to the test image, wherein, the learning device, (i) has performed or has supported the auto-labeling device to perform a process of inputting at least one main training image into the coverage controlling module, to thereby allow the coverage controlling module to detect at least one object for main training on the main training image and thus to output at least one first bounding box data for main training, (ii) has performed or has supported the auto-labeling device to perform a process of inputting the main training image and first bounding box data for main training into the class-agnostic refinement module, to thereby allow the class-agnostic refinement module to detect the object for main training on the main training image and thus to generate at least one second bounding box data for main training, (iii) has performed a process of allowing the class-agnostic refinement module to align the first bounding box data for main training and the second bounding box data for main training to thereby output at least one refined bounding box data for main training, and (iv) has performed a process of generating at least one bounding box loss for main training by referring to the refined bounding box data for main training and at least one ground truth of the main training image, to thereby train the class-agnostic refinement module by using the bounding box loss for main training.

5. The method of claim 4, wherein, at the (ii), the learning device (ii-1) has performed or has supported the auto-labeling device to perform a process of inputting the main training image into the accuracy controlling module, to thereby allow the accuracy controlling module to detect the object for main training on the main training image and thus to output at least one third bounding box data for main training, and (ii-2) has performed a process of merging the second object detection data for main training and the third object detection data for main training, to thereby generate at least one merged bounding box data for main training and thus update the second object detection data for main training with the merged bounding box data for main training.

6. The method of claim 5, wherein the learning device has performed a process of merging the second object detection data for main training and the third object detection data for main training by using a non-maximum suppression scheme.

7. The method of claim 1, wherein, by a learning device, the class-agnostic refinement module has been trained to output the second bounding box data for testing corresponding to the test image, wherein the learning device (i) (i-1) has performed or has supported the auto-labeling device to perform a process of inputting at least one first sub training image into the coverage controlling module, to thereby allow the coverage controlling module to detect at least one object for first sub training on the first sub training image and thus to output at least one first bounding box data for first sub training, (i-2) has performed a process of inputting the first sub training image into bounding box error module, to thereby allow the bounding box error module to predict at least one error between the first bounding box data for first sub training and at least one ground truth of the first sub training image and thus to output at least one bounding box error prediction for first sub training, (i-3) performs a process of generating at least one bounding box error loss for first sub training by referring to the first bounding box data for first sub training and the ground truth of the first sub training image, to thereby train the bounding box error module by using the bounding box error loss for first sub training, (ii) (ii-1) has performed a process of inputting at least one second sub training image into the bounding box error module, to thereby allow the bounding box error module to output at least one bounding box error prediction for second sub training which corresponds to at least one object for second sub training on the second sub training image, (ii-2) has performed a process of performing at least one concatenation operation by using the bounding box error prediction for second sub training and at least one ground truth of the second sub training image and thus has generated at least one first bounding box data for second sub training, (ii-3) has performed or has supported the auto-labeling device to perform a process of inputting the second sub training image and the first bounding box data for second sub training into the class-agnostic refinement module, to thereby allow the class-agnostic refinement module to detect the object for second sub training on the second sub training image and thus to generate at least one second bounding box data for second sub training, (ii-4) has performed a process of allowing the class-agnostic refinement module to align the first bounding box data for second sub training and the second bounding box data for second sub training, to thereby output at least one refined bounding box data for second sub training, and (ii-5) has performed a process of generating at least one bounding box loss for second sub training by referring to the refined bounding box data for second sub training and the ground truth of the second sub training image, to thereby train the class-agnostic refinement module by using the bounding box loss for second sub training.

8. The method of claim 7, wherein the learning device has performed a process of allowing the bounding box error module (i) to perform at least one convolution operation on the first sub training image and thus to generate at least one feature map for first sub training, (ii) to perform at least one ROI pooling operation on the feature map for first sub training by using the ground truth of the first sub training image and thus to generate at least one pooled feature map for first sub training, and (iii) to perform at least one fully-connected operation on the pooled feature map for first sub training and thus to output the bounding box error prediction for first sub training.

9. The method of claim 8, wherein the learning device allows the bounding box error module to perform a set of operations including an operation of randomly setting at least one element of the pooled feature map for first sub training to zero and the fully-connected operation thereon.

10. An auto-labeling device for auto-labeling at least one test image by using a class-agnostic refinement module, comprising:
   at least one memory that stores instructions; and
   at least one processor configured to execute the instructions to perform or support another device to perform:
      (I) if the test image is acquired, a process of inputting the test image into a coverage controlling module, to thereby allow the coverage controlling module to detect at least one object for testing on the test image and thus to output at least one first object detection data for testing which includes at least one first bounding box data for testing and at least one first class data for testing; (II) a process of inputting the test image and the first bounding box data for testing into the class-agnostic refinement module, to thereby allow the class-agnostic refinement module to detect the object for testing on the test image and thus to generate at least one second bounding box data for testing, and a process of allowing the class-agnostic refinement module to align the first bounding box data for testing and the second bounding box data for testing to thereby output at least one refined bounding box data for testing; and
      (III) a process of generating at least one second object detection data for testing which includes the first class data for testing and the refined bounding box data for testing.

11. The auto-labeling device of claim 10, wherein, at the process of (II), the processor performs a process of inputting the test image into an accuracy controlling module, to thereby allow the accuracy controlling module to detect the object for testing on the test image and thus to output at least one third object detection data for testing which includes at least one third bounding box data for testing and at least one third class data for testing, and a process of merging the second object detection data for testing and the third object detection data for testing, to thereby generate at least one merged object detection data for testing and thus update the second object detection data for testing with the merged object detection data for testing.

12. The auto-labeling device of claim 11, wherein, at the process of (II), the processor performs a process of merging the second object detection data for testing and the third object detection data for testing by using a non-maximum suppression scheme.

13. The auto-labeling device of claim 10, wherein, by a learning device, the class-agnostic refinement module has been trained to output the second bounding box data for testing corresponding to the test image, and
   wherein, the learning device, (i) has performed or has supported the auto-labeling device to perform a process of inputting at least one main training image into the coverage controlling module, to thereby allow the coverage controlling module to detect at least one object for main training on the main training image and thus to output at least one first bounding box data for main training, (ii) has performed or has supported the auto-labeling device to perform a process of inputting the main training image and first bounding box data for main training into the class-agnostic refinement module, to thereby allow the class-agnostic refinement module to detect the object for main training on the main training image and thus to generate at least one second bounding box data for main training, (iii) has performed a process of allowing the class-agnostic refinement module to align the first bounding box data for main training and the second bounding box data for main training to thereby output at least one refined bounding box data for main training, and (iv) has performed a process of generating at least one bounding box loss for main training by referring to the refined bounding box data for main training and at least one ground truth of the main training image, to thereby train the class-agnostic refinement module by using the bounding box loss for main training.

14. The auto-labeling device of claim 13, wherein, at the (ii), the learning device (ii-1) has performed or has supported the auto-labeling device to perform a process of inputting the main training image into the accuracy controlling module, to thereby allow the accuracy controlling module to detect the object for main training on the main training image and thus to output at least one third bounding box data for main training, and (ii-2) has performed a process of merging the second object detection data for main training and the third object detection data for main training, to thereby generate at least one merged bounding box data for main training and thus update the second object detection data for main training with the merged bounding box data for main training.

15. The auto-labeling device of claim 14, wherein the learning device has performed a process of merging the second object detection data for main training and the third object detection data for main training by using a non-maximum suppression scheme.

16. The auto-labeling device of claim 10, wherein, by a learning device, the class-agnostic refinement module has been trained to output the second bounding box data for testing corresponding to the test image, and
   wherein the learning device (i) (i-1) has performed or has supported the auto-labeling device to perform a process of inputting at least one first sub training image into the coverage controlling module, to thereby allow the coverage controlling module to detect at least one object for first sub training on the first sub training image and thus to output at least one first bounding box data for first sub training, (i-2) has performed a process of inputting the first sub training image into bounding box error module, to thereby allow the bounding box error module to predict at least one error between the first bounding box data for first sub training and at least one ground truth of the first sub training image and thus to output at least one bounding box error prediction for first sub training, (i-3) performs a process of generating at least one bounding box error loss for first sub training by referring to the first bounding box data for first sub training and the ground truth of the first sub training image, to thereby train the bounding box error module by using the bounding box error loss for first sub training, (ii) (ii-1) has performed a process of inputting at least one second sub training image into the bounding box error module, to thereby allow the bounding box error module to output at least one bounding box error prediction for second sub training which corresponds to at least one object for second sub training on the second sub training image, (ii-2) has performed a process of performing at least one concatenation operation by using the bounding box error prediction for second sub training and at least one ground truth of the second sub training image and thus has generated at least one first bounding box data for second sub training, (ii-3) has performed or has supported the auto-labeling device to perform a process of inputting the second sub training image and the first bounding box data for second sub training into the class-agnostic refinement module, to thereby allow the class-agnostic refinement module to detect the object for second sub training on the second sub training image and thus to generate at least one second bounding box data for second sub training, (ii-4) has performed a process of allowing the class-agnostic refinement module to align the first bounding box data for second sub training and the second bounding box data for second sub training, to thereby output at least one refined bounding box data for second sub training, and (ii-5) has performed a process of generating at least one bounding box loss for second sub training by referring to the refined bounding box data for second sub training and the ground truth of the second sub training image, to thereby train the class-agnostic refinement module by using the bounding box loss for second sub training.

17. The auto-labeling device of claim 16, wherein the learning device has performed a process of allowing the bounding box error module (i) to perform at least one convolution operation on the first sub training image and thus to generate at least one feature map for first sub training, (ii) to perform at least one ROI pooling operation on the feature map for first sub training by using the ground truth of the first sub training image and thus to generate at least one pooled feature map for first sub training, and (iii) to perform at least one fully-connected operation on the pooled feature map for first sub training and thus to output the bounding box error prediction for first sub training.

18. The auto-labeling device of claim 17, wherein the learning device allows the bounding box error module to perform a set of operations including an operation of randomly setting at least one element of the pooled feature map for first sub training to zero and the fully-connected operation thereon.

* * * * *